United States Patent

King et al.

[11] Patent Number: 6,152,678
[45] Date of Patent: Nov. 28, 2000

[54] APPARATUS FOR THE MECHANICAL HANDLING OF PALLETS

[75] Inventors: Gabriel King, Triberg; Engelbert Nagel, Lauterbach, both of Germany

[73] Assignee: Graesslin KG, St. Georgen, Germany

[21] Appl. No.: 09/356,052

[22] Filed: Jul. 16, 1999

[51] Int. Cl.[7] .................................................. B65G 60/00
[52] U.S. Cl. ..................... 414/749.5; 414/788.7
[58] Field of Search ........................ 414/222.07, 222.1, 414/222.11, 222.12, 226.01, 749.5, 749.6, 788.7

[56] References Cited

U.S. PATENT DOCUMENTS

| | | | |
|---|---|---|---|
| 4,462,741 | 7/1984 | Sogawa et al. | 414/788.7 X |
| 4,687,403 | 8/1987 | Motoda | 414/788.7 X |
| 4,824,310 | 4/1989 | Kosmowski et al. | 414/749.5 X |

FOREIGN PATENT DOCUMENTS 34 37 004  5/1985  Germany .
1-115526  5/1989  Japan ................................. 414/788.7

*Primary Examiner*—Janice L. Krizek
*Attorney, Agent, or Firm*—Foley & Lardner

[57] ABSTRACT

An apparatus for mechanically handling pallets includes a first pallet lift and a second pallet lift, both of which move vertically. A processing station is disposed between the first and second pallet lifts, where a pallet table is provided. A transporting frame is capable of moving horizontally along a plane near the top-most vertical position of the first and second pallet lifts. The transporting frame is sized so that it can hold two pallets at the same time, thereby when one pallet is being received from the first pallet lift onto the transporting frame, another pallet can be processed at the processing station. Also, when the transporting frame is moved horizontally, the another pallet that was previously processed can be removed by way of the second pallet lift, while at the same time the one pallet can be moved to the processing station where the pallet table is provided.

8 Claims, 3 Drawing Sheets

APPARATUS FOR THE MECHANICAL HANDLING OF PALLETS

FIELD OF THE INVENTION

The invention relates to an apparatus for the mechanical handling of pallets.

DESCRIPTION OF THE RELATED ART

In the case of such an apparatus having a first pallet lift, via which the pallets loaded with workpieces which are to be processed are transported up, and having a second pallet lift, by means of which the processed empty pallets are removed, and having a horizontally displaceably mounted transporting frame, which is equipped with pallet-gripping elements, for releasably fixing in a force-fitting manner at least one pallet, and removes a pallet from a pallet stack, guides it to a processing station and, following processing of the workpieces located in the pallet, sets down the pallet at a set-down location to form a new stack, it is necessary for the pallet transportation to and from a processing station to run as quickly as possible, i.e., without significant idling times or standstill times between the individual pallet station. This is intended to ensure that the pallet located in the processing position is not involved in horizontal transportation throughout the processing period.

DE-A 34 37 004 discloses a continuous production system having production units which are arranged in series and are supplied and discharged by a workpiece gripper, for which purpose the gripper removes blanks and workpieces from pallets, and feeds them thereto. The pallets, for their part, by way of a pallet-transporting assembly with an integrated pallet lift, are destacked at standby and set-down locations, in the vicinity of the production units, and are brought into the range of the workpiece gripper, shifted. Once processing of all the workpieces has been finished, the pallets are set down at a set-down location to form a new stack. In the case of which the transporting assembly is equipped with a pallet-gripping element, which can be displaced along a first pallet lift, and, above the top edge of the stacks, with a top-level operating plane which can be reached by the workpiece gripper and in which individual pallets, together with the pallet-gripping elements retaining them, the pallets are transferred and/or retrieved from there and guided beyond the stack or stacks.

The known continuous production system is beset by the disadvantage that the pallet loaded with blanks and workpieces, which has been guided up to the production unit or a processing station by a horizontally displaceable transporting frame, cannot be disengaged from the transporting frame during the processing phase, and that this means that a considerable amount of time is required in order to remove the processed pallet and to provide a further pallet loaded with workpieces.

SUMMARY OF THE INVENTION

An object of the invention is to eliminate the disadvantages of the known continuous production system and to provide an apparatus for the mechanical handling of pallets in the case of which, with clock control, the running times for removing a processed pallet and feeding to a processing station a pallet loaded with workpieces are as short as possible, i.e. negligibly short.

In the case of the apparatus according to the invention, it is not just advantageous that arranged between the two pallet lifts, level with the vertical top end position of the latter, is a rigidly arranged pallet table on which it is possible to deposit a pallet which is dynamically disengaged from the transporting frame during the processing; it is also advantageous that, in spatial terms, the transporting frame is designed for at least two pallets arranged one behind the other in the transporting direction, with the result that in each case at least two pallets can be displaced synchronously with one another by the transporting frame in a functionally conforming manner.

Also advantageous are the pallet-gripping elements, which in spatial terms are arranged beneath the pallet plane, and the guides of the pallet lifts, which in spatial terms are arranged beneath the pallet table.

A further advantage of the novel apparatus is that the pallet-gripping elements, which are provided in the transporting frame, can be opened and closed irrespective of the processing of the pallet.

BRIEF DESCRIPTION OF THE DRAWINGS

An exemplary embodiment of the apparatus according to the invention is explained in more detail hereinbelow and illustrated in the drawings, in which.

DETAILED DESCRIPTION

Figure 1:
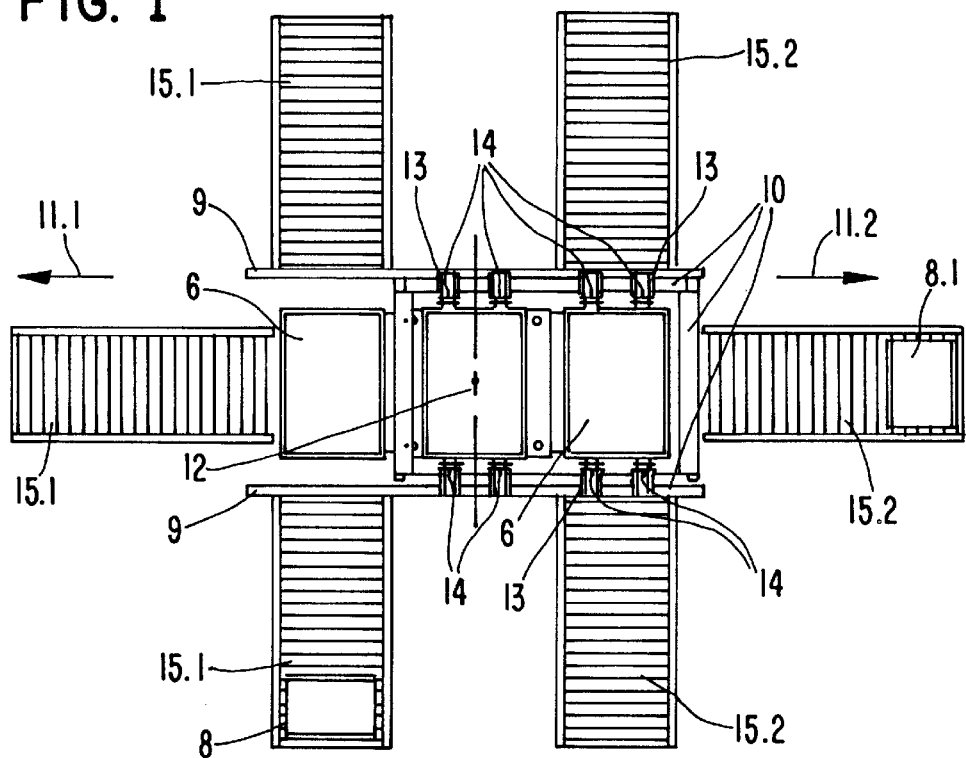
FIG. 1 shows a diagrammatic plan view of the apparatus.

The apparatus illustrated in FIGS. 1 to 6 essentially comprises the apparatus framework 1, the two lift columns 2.1 and 2.2, and the two pallet lifts 5.1 and 5.2, which are arranged adjacent to one another in a mirror-inverted manner. The pallet lifts 5.1 and 5.2 are mounted on the respective lift column 2.1 and 2.2 on one side by means of the bearing sleeves 3.1 and 3.2, can be displaced vertically in the arrow directions 4.1 and 4.2 and are provided, in the respective border region of the two lift tables 6 with fixing elements 7 for fixing the position of the pallets 8 or of a corresponding stack with pallets 8.

9 designates a horizontally running guide, for example a roller bed, in which a transporting frame 10 is mounted such that it can be displaced horizontally in the arrow directions 11.1 and 11.2. Arranged level with the guide 9 and/or the transporting frame 10, in spatial terms symmetrically between the two pallet lifts 5.1 and 5.2, is a pallet table 12 on which it is possible to deposit a pallet 8 which is to be processed. In spatial terms, the pallet table 12 is expediently arranged adjacent to a so-called pallet-processing and/or assembly station 16 (not illustrated specifically).

The transporting frame 10 is equipped with rollers 13. Moreover, arranged in the border region of the transporting frame 10, in particular located opposite one another, are pallet-gripping elements 14, for fixing pallets 8 and fastening them releasably in a force-fitting manner. In spatial terms, the transporting frame 10 is dimensioned such that at least two pallets 8, 8.1 are arranged one behind the other in the transporting direction 11.1, with the result that these two pallets 8 in each case can be displaced synchronously with one another by the transporting frame 10 in a functionally conforming manner.

In FIG. 1, 15.1 and 15.2 designate so-called roller conveyors. The roller conveyors 15.1 serve for transporting up the pallets 8 loaded with workpieces or corresponding pallet stacks, whereas the roller conveyors 15.2 are provided for removing processed, i.e. empty, pallets 8.1 or a corresponding pallet stack.

Figure 2:
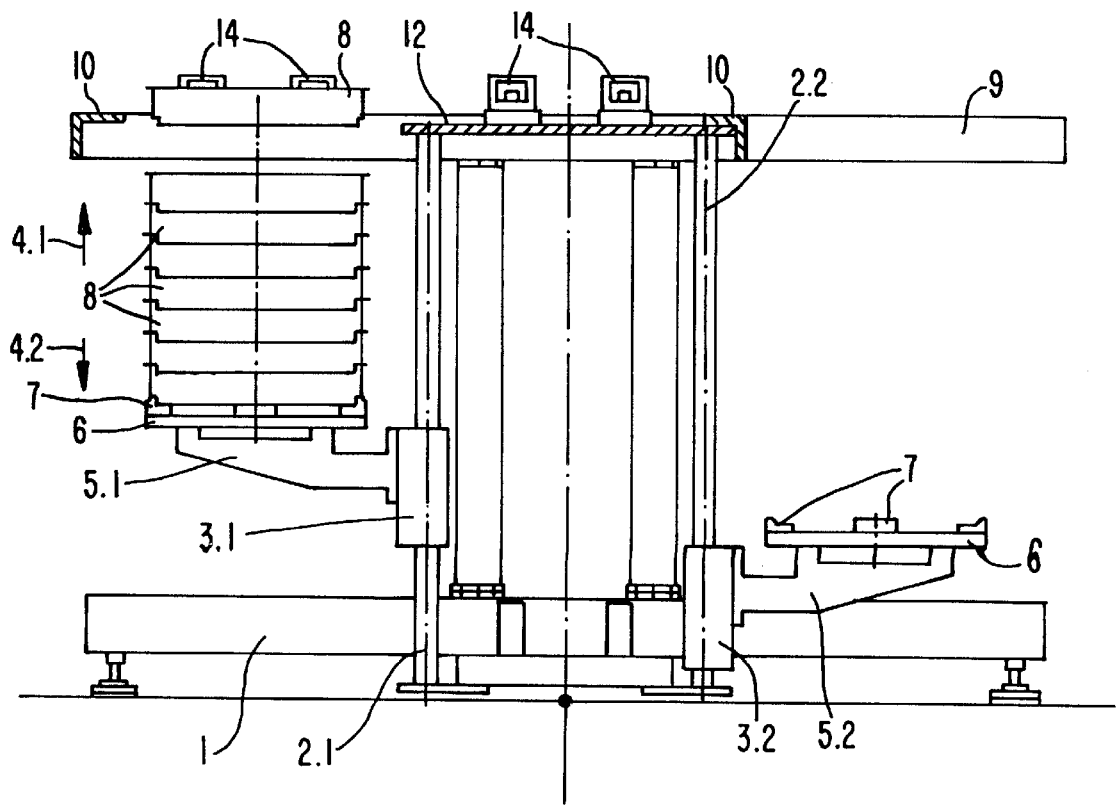
FIG. 2 shows a diagrammatic side view of the apparatus according to FIG. 1 with a pallet stack on a pallet lift in the "pallet which is to be processed received by the transporting frame" functional position.
Figure 3:
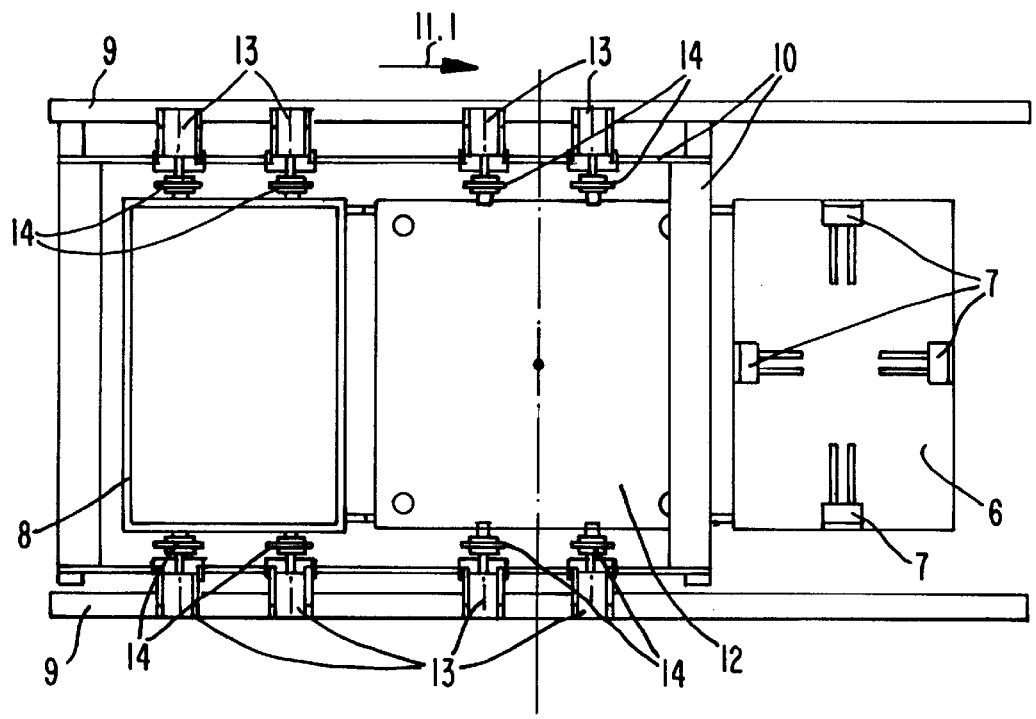
FIG. 3 shows a diagrammatic plan view of the apparatus in the functional illustration of the transporting frame and of the pallet according to FIG. 2.

In FIGS. 2 and 3, the transporting frame 10 is located in a position for receiving from the pallet stack a pallet 8 loaded with workpieces. 14 designates the pallet-gripping elements, which are provided on the transporting frame 10 and, once a pallet 8 has been received, releasably fix the pallet 8 in position in a force-fitting manner. 9 designates the guide and 12 designates the pallet table between the two pallet lifts 5.1 and 5.2.

Figure 4:
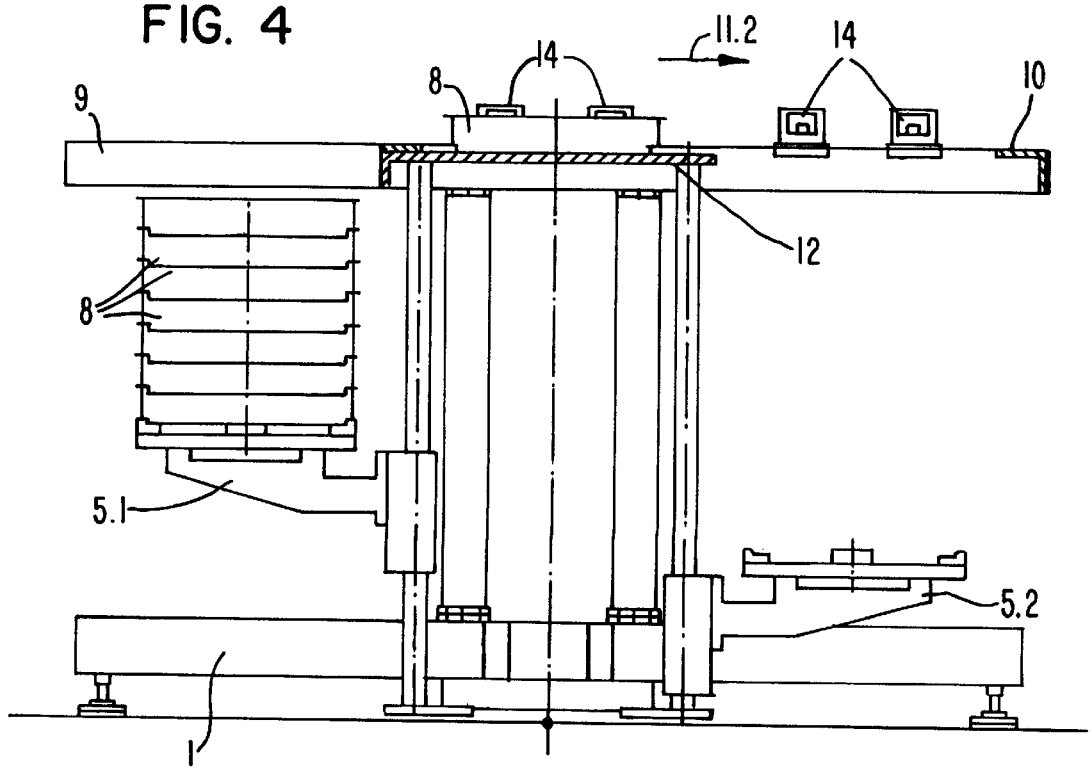
FIG. 4 shows a diagrammatic side view of the apparatus according to FIG. 1 in the "pallet for processing on the pallet table, transporting frame over the pallet table and the pallet lift for the pallet-removal station" functional position.

The transporting frame 10 is then displaced, in a functionally conforming manner, in arrow direction 11.2 until the pallet 8 has reached the processing position 16 over the pallet table 12, according to FIG. 4.

In the processing position 16, the pallet 8 is dynamically disengaged from the transporting frame 10, by virtue of the pallet-gripping elements 14 being opened, and set down on the pallet table 12, for processing of the workpieces (not illustrated specifically), as can be seen from FIG. 4.

Figure 5:
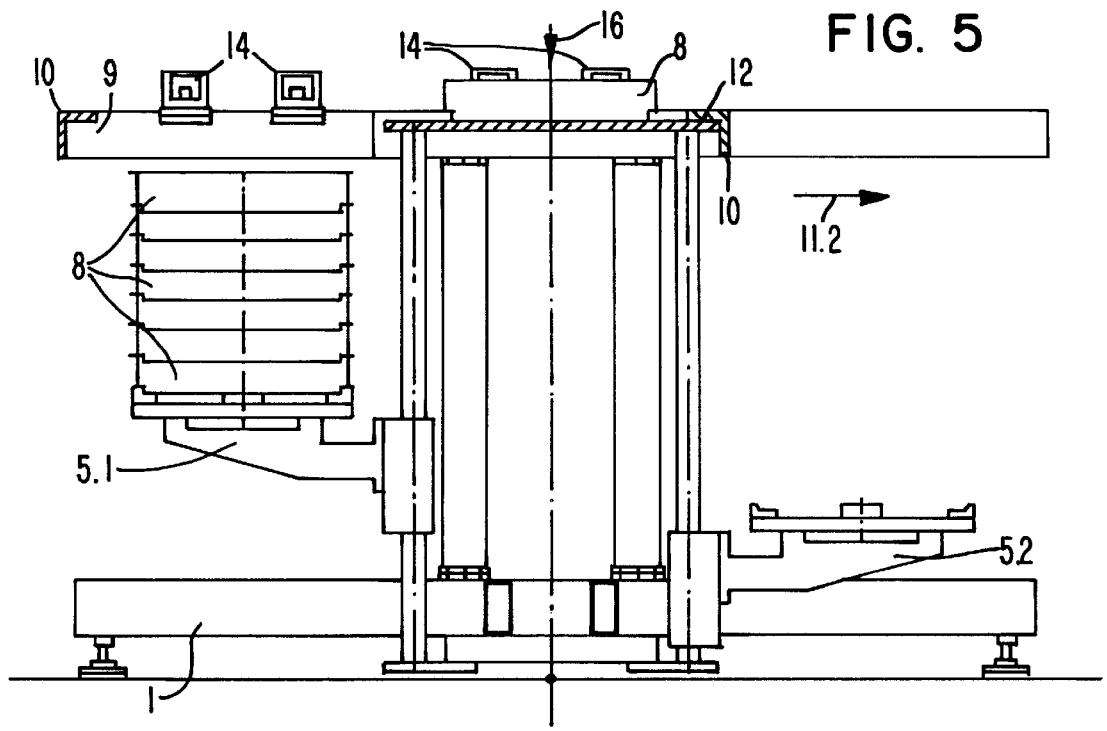
FIG. 5 shows a diagrammatic side view of the apparatus according to FIG. 1 in the "pallet for processing on the pallet table, transporting frame over the pallet table and the pallet lift with workpiece-loaded pallets" functional position.
Figure 6:
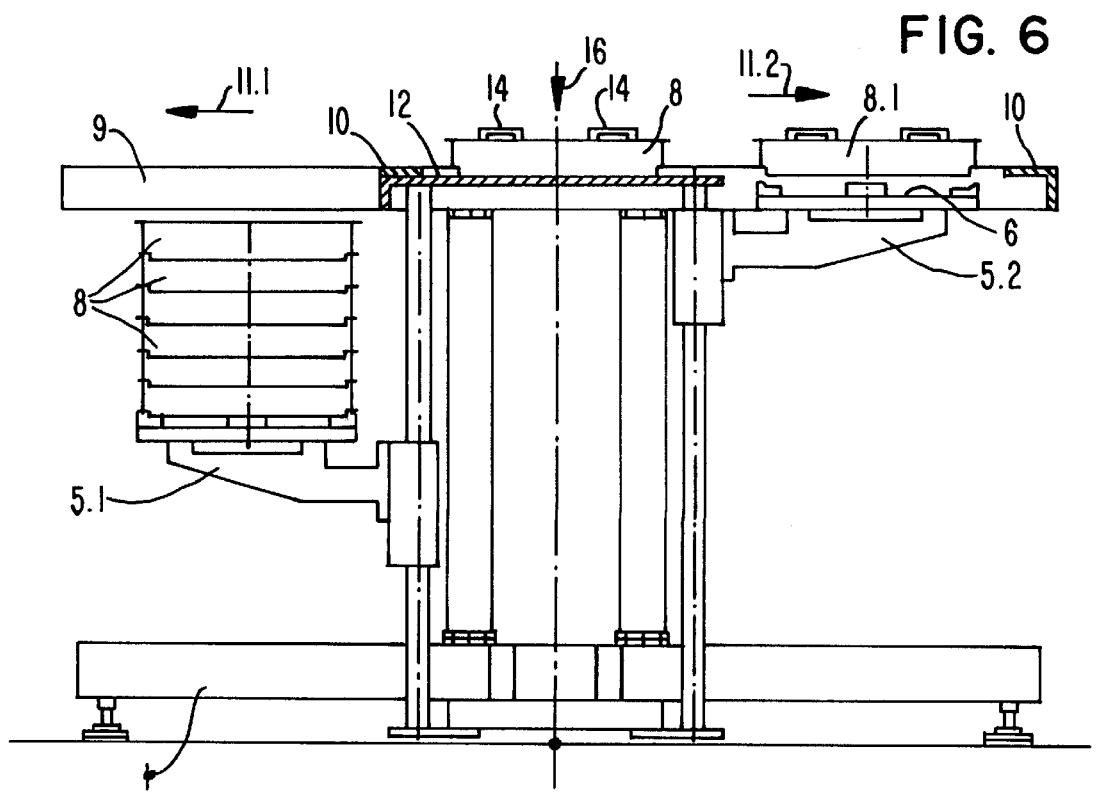
FIG. 6 shows a diagrammatic side view of the apparatus according to FIG. 1 in the "pallet for processing on the pallet table, transporting frame over the pallet table and with processed pallet over the pallet lift for the pallet-removal station" functional position.

The transporting frame 10 immediately moves back, in the empty state, into a position, in accordance with the illustration of FIG. 5, for receiving a loaded pallet 8 again. The transporting frame 10 then remains in the position according to FIG. 5 until the pallet 8 has been processed. As soon as this pallet 8 has been processed, it is fixed in a force-fitting manner by the adjacent pallet-gripping elements 14. The transporting frame 10 then immediately moves in arrow direction 11.2 and transports the processed pallet 8.1 over the lift table 6 and dynamically disengages it from the transporting frame 10. At the same time, the loaded pallet 8 which is in series with the pallet 8.1 is guided onto the pallet table 12 by the transporting frame 10 and dynamically disengaged there for processing by a processing system (not illustrated specifically). Once the pallet 8.1 has been disengaged, the transporting frame 10 immediately moves back, in arrow direction 11.1, into a position according to FIG. 5 for the purpose of receiving a further pallet 8 loaded with workpieces.

It is also within the scope of the invention for empty pallets 8.1 to be transported up or removed in order to be filled in the processing station 16.

In a modification of the general idea of the invention, instead of the transporting frame 10, there are two transporting arms which can be moved synchronously with one another, are equipped with corresponding pallet-gripping elements and by means of which two pallets can be transported simultaneously synchronously with one another and in a functionally conforming manner.

What is claimed is:

1. An apparatus for mechanical handling of pallets comprising:

a first pallet lift;

a second pallet lift;

a processing station which is arranged for action between the first and second pallet lifts;

a horizontally arranged guide; and a transporting frame which is mounted such that it can be displaced horizontally on the guide, the transporting frame being equipped with pallet-gripping elements for releasably fixing in a force-fitting manner a pallet loaded with workpieces, and the transporting frame being operable to horizontally transport the loaded pallet into a processing position and to uniformly transport a processed pallet further to the second pallet lift, wherein arranged between the first and second pallet lifts, level with a vertical top end position of the first and second pallet lifts, is a rigidly arranged pallet table on which it is possible to deposit a pallet which is dynamically disengaged from the transporting frame during processing of the pallet, and wherein the transporting frame is of a size to support at least two pallets arranged one behind the other in a transporting direction, with a result that the at least two pallets are displaced synchronously with one another in a horizontal direction by the transporting frame.

2. The apparatus as claimed in claim 1, further comprising first and second lift-column guides that are arranged beneath the pallet table.

3. The apparatus as claimed in claim 1, wherein the pallet-gripping elements are arranged on the transporting frame to grip respective side portions of the at least two pallets.

4. The apparatus as claimed in claim 3, wherein the pallet-gripping elements are constructed to be opened and closed irrespective of the processing of the pallet on the pallet table.

5. An apparatus for processing pallets, comprising:

a first pallet lift that moves in a vertical direction and that provides pallets one at a time to a pallet receiving position, the pallet receiving position corresponding to a top-most position of the first pallet lift;

a second pallet lift that moves in the vertical direction and that removes pallets one at a time from a pallet removing position, the pallet removing position corresponding to a top-most position of the second pallet lift, the top-most position of the first pallet lift corresponding in height to the top-most position of the second pallet lift;

a pallet table disposed between the first and second pallet lifts, the pallet table being disposed at a location at which pallets are processed one at a time; and a moving guide that moves horizontally along a plane above the pallet table and above the first and second pallet lifts, the moving guide having a size such that the moving guide can hold at least two pallets at a same time, wherein, when the moving guide is at a first position, the moving guide is positioned to receive a first pallet from the first pallet lift while at the same time the moving guide is positioned to deposit a second pallet onto the pallet table, and wherein, when the moving guide is at a second position that is horizontally disposed with respect to the first position, the moving guide is positioned to deposit the first pallet onto the pallet table while at the same time the moving guide is positioned to deposit the second pallet onto the second pallet lift.

6. The apparatus as claimed in claim 5, wherein the pallet table is positioned at a processing station that is centrally positioned between the first and second pallet lifts.

7. The apparatus as claimed in claim 5, further comprising:

a first running guide; and a second running guide, wherein the moving guide includes rollers that engage the first and second running guides to provide for horizontal movement of the moving guide.

8. The apparatus as claimed in claim 7, further comprising:

a plurality of pallet-gripping elements disposed on the moving guide, the plurality of pallet-gripping elements configured to hold the first and second pallets in place on the moving guide, and to deposit the first pallet onto the pallet table when the moving guide has moved from the first position to the second position.

* * * * *